US010532655B2

(12) United States Patent
Neumüller et al.

(10) Patent No.: US 10,532,655 B2
(45) Date of Patent: Jan. 14, 2020

(54) PORTAL AXLE

(71) Applicant: ZF FRIEDRICHSHAFEN AG, Friedrichshafen (DE)

(72) Inventors: Rudolf Neumüller, Buechlberg (DE); Paul Lenz, Waldkirchen (DE); Manuel Bauer, Tittling (DE); Stefan Brachmeier, Geisenhausen (DE); Daniela Wagner, Egglham (DE); Peter Haselberger, Mauth (DE); Daniel Dudek, Salzweg (DE); Klaus Alesch, Untergriesbach (DE); Horst Sigl, Tiefenbach (DE); Alexander Enderl, Vilshofen (DE)

(73) Assignee: ZF Friedrichshafen AG, Friedrichshafen (DE)

( * ) Notice: Subject to any disclaimer, the term of this patent is extended or adjusted under 35 U.S.C. 154(b) by 44 days.

(21) Appl. No.: 15/568,597

(22) PCT Filed: Mar. 24, 2016

(86) PCT No.: PCT/EP2016/056510
§ 371 (c)(1),
(2) Date: Oct. 23, 2017

(87) PCT Pub. No.: WO2016/173783
PCT Pub. Date: Nov. 3, 2016

(65) Prior Publication Data
US 2018/0154770 A1   Jun. 7, 2018

(30) Foreign Application Priority Data

Mar. 24, 2016  (DE) .................. 10 2015 207 887

(51) Int. Cl.
*B60K 17/04*   (2006.01)
*B60B 35/00*   (2006.01)
(Continued)

(52) U.S. Cl.
CPC .......... *B60K 17/043* (2013.01); *B60B 35/002* (2013.01); *F16H 1/20* (2013.01); *F16H 57/021* (2013.01)

(58) Field of Classification Search
CPC ....... B60K 17/043; F16H 57/021; F16H 1/20; B60B 35/002; B60Y 2200/1432
See application file for complete search history.

(56) References Cited

U.S. PATENT DOCUMENTS 1,668,210 A * 5/1928 Kincaid ............... B60K 17/043
180/10
2,031,584 A * 2/1936 Austin ..................... F16H 37/08
74/366
(Continued)

FOREIGN PATENT DOCUMENTS

DE   2402772   8/1974
DE   3027806   2/1982
(Continued)

*Primary Examiner* — Darlene P Condra
(74) *Attorney, Agent, or Firm* — Cozen O'Connor

(57) ABSTRACT

The invention is directed to a portal axle for low-slung vehicles, comprising a portal housing 1, 1' into the interior 2 of which is guided proceeding from an axle bracket side a drive shaft 17 on which a drive wheel 3 is arranged so as to be fixed with respect to rotation relative to it, with intermediate wheels 4 which are rotatably mounted on bearing pins 12 in the portal housing 1, 1' and which can be rotatably driven by the drive wheel 3 and by means of which an output wheel 5 which is arranged in the portal housing 1, 1' on an output shaft so as to be fixed with respect to rotation relative to it can be rotatably driven, this output wheel 5 projecting into a hub carrier 6 which can be fixedly connected to the portal housing 1, 1'. The drive shaft 17 and the output shaft extend so as to be axially offset, and a brake caliper of a disk brake is arranged radially adjacent to the portal housing 1, 1'. The portal housing 1, 1' has on its axle
(Continued)

bracket side a mounting orifice 9 which can be closed by a closure part and through which the drive wheel 3 and the intermediate wheels 4 can be inserted into the portal housing 1, 1', wherein the intermediate wheels 4 have a larger diameter than the output wheel 5.

14 Claims, 2 Drawing Sheets

(51) Int. Cl.
*F16H 1/20* (2006.01)
*F16H 57/021* (2012.01)

(56) References Cited

U.S. PATENT DOCUMENTS

| | | | | |
|---|---|---|---|---|
| 2,915,920 A | * | 12/1959 | Keese | F16H 37/08 180/371 |
| 3,802,289 A | | 4/1974 | Cheek | |
| 5,388,473 A | * | 2/1995 | Black | B63H 23/08 74/333 |
| 6,035,956 A | | 3/2000 | Maurer | |
| 2004/0026157 A1 | * | 2/2004 | Varela | B60K 17/043 180/371 |
| 2014/0152075 A1 | * | 6/2014 | Kanatani | B60K 7/0007 301/6.5 |
| 2014/0246263 A1 | | 9/2014 | Strenge | |
| 2016/0052389 A1 | * | 2/2016 | Bittlingmaier | B60K 17/043 180/253 |
| 2018/0118021 A1 | * | 5/2018 | Moscoso | B60K 17/043 |

FOREIGN PATENT DOCUMENTS

| | | |
|---|---|---|
| DE | 4124016 | 1/1993 |
| DE | 19604730 | 8/1997 |
| DE | 10250481 | 5/2004 |
| DE | 102004003645 | 8/2005 |
| DE | 102004003650 | 8/2005 |
| DE | 102004043285 | 3/2006 |
| DE | 602004001176 | 10/2006 |
| DE | 102007004173 | 7/2008 |
| EP | 1418068 | 5/2004 |

* cited by examiner

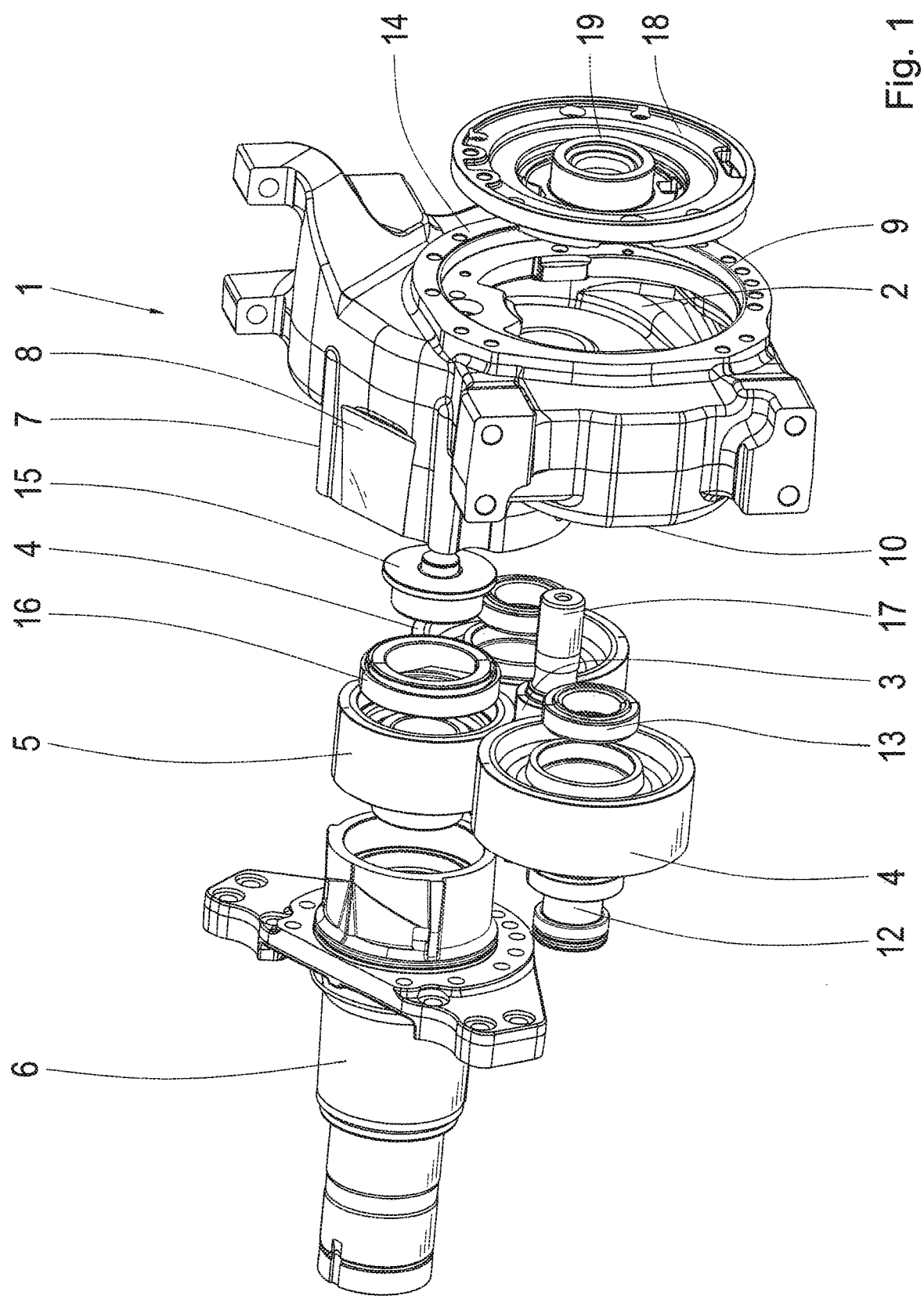

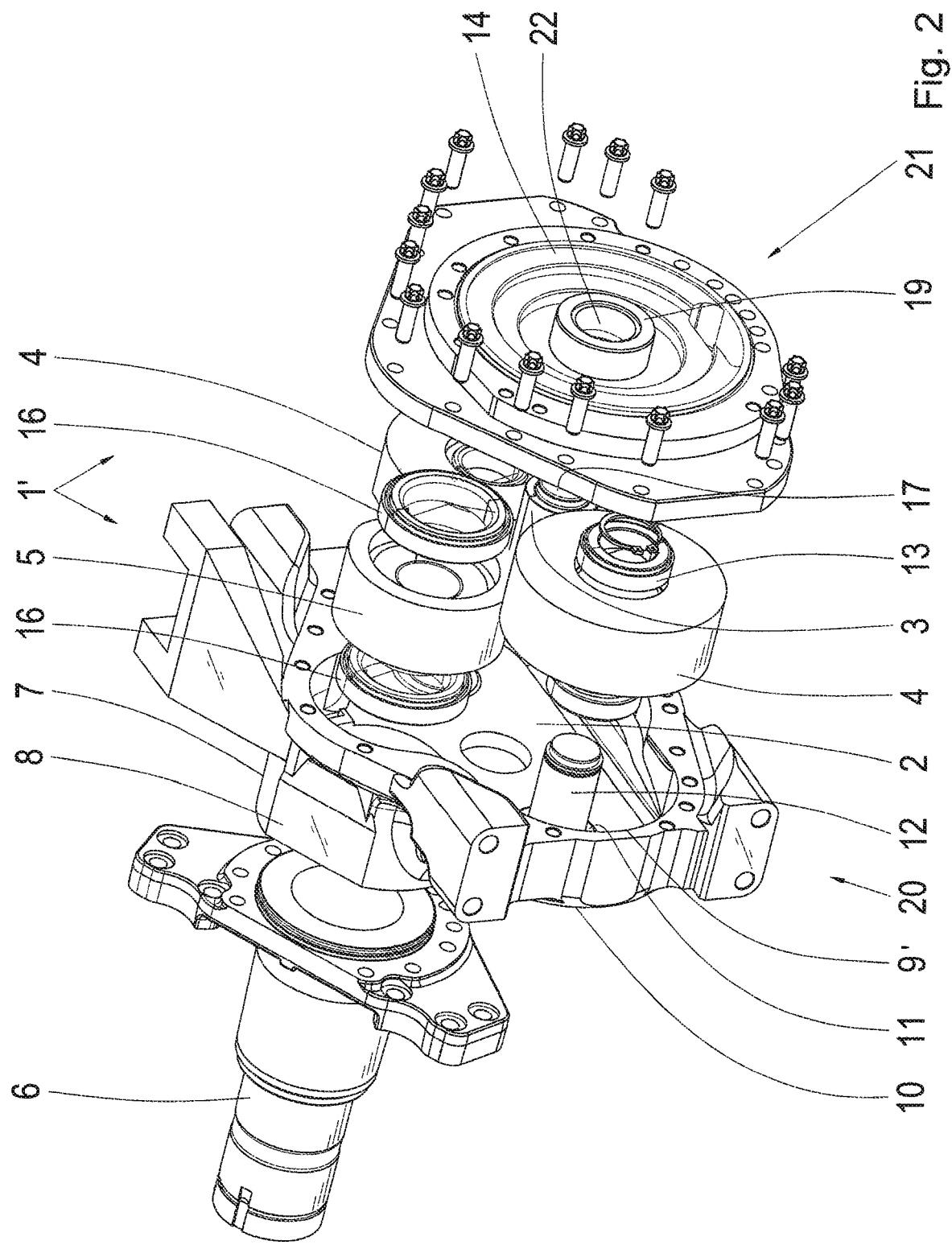

PORTAL AXLE

PRIORITY CLAIM

This is a U.S. national stage of application No. PCT/EP2016/056510, filed on Mar. 24, 2016. Priority is claimed on the following application: Country: Germany, Application No.: 10 2015 207 887.6, filed: Apr. 29, 2015, the content of which is/are incorporated herein in its entirety by reference.

The present invention is directed to a portal axle for low-floor vehicles, comprising a portal housing into the interior of which is guided proceeding from an axle bracket side a drive shaft on which a drive wheel is arranged so as to be fixed with respect to rotation relative to it, with intermediate wheels which are rotatably mounted on bearing pins in the portal housing and which can be rotatably driven by the drive wheel and by which an output wheel which is arranged in the portal housing on an output shaft so as to be fixed with respect to rotation relative to it can be rotatably driven. This output wheel is projecting into a hub carrier which can be fixedly connected to the portal housing, and the drive shaft and the output shaft extend so as to be axially offset, and a brake caliper of a disk brake is arranged radially adjacent to the portal housing.

BACKGROUND OF THE INVENTION

In portal axle systems with a portal axle of this type, the brake disk is arranged radially inside of the key of the wheel rim, and the brake disk is surrounded by the brake caliper of a disk brake at its radially circumferential outer contour. This means that the maximum dimensioning of the brake disk is limited by the inner diameter of the key of the wheel rim. When smaller vehicle wheels are used for the vehicle, the rim is also reduced in size so that the diameter of the brake disk must also be reduced. In known portal housings, the drive wheel, the intermediate wheels and the output wheel are introduced into the portal housing through an orifice coaxial to the output shaft in the wall of the portal housing on the hub carrier side and mounted therein. This means that whichever gear—the drive wheel, intermediate wheels or output wheel—has the largest diameter determines the diameter of the orifice. However, the diameter of the orifice also determines the radial distance of the outer contour of the portal housing in the area of the orifice from the rotational axis of the output shaft. This outer contour in turn determines the smallest possible radial distance from the output axle in which the brake caliper of a disk brake can be arranged. But this also means that not any small vehicle wheel can be used because the smallest possible distance of the brake caliper of a disk brake from the drive axle must be met.

Therefore, it is an object of the invention to provide a portal axle which makes it possible to use vehicle wheels having a small diameter.

SUMMARY OF THE INVENTION

This object is met in that the portal housing has on its axle bracket side a mounting orifice which can be closed by a closure part and through which the drive wheel and the intermediate wheels can be inserted into the portal housing, and the intermediate wheels have a larger diameter than the output wheel.

The portal housing can also be configured such that the output wheel can likewise be inserted into the portal housing together with the drive wheel and the intermediate wheels through the same closeable mounting orifice.

Due to the larger diameters of the intermediated gears, the output wheel can have a reduced diameter so that the radius of the outer contour of the portal housing can be configured smaller relative to the rotational axis of the output shaft in the area of the output shaft, and the brake caliper of a disk brake can be arranged closer to the rotational axis of the output shaft. This also allows a smaller diameter of the brake disk and vehicle wheels of smaller diameter.

When the drive wheel has twenty-two teeth, the intermediate wheel or intermediate wheels has or have sixty-nine teeth and the output wheel has fifty-five teeth, then the module and the face width of these gears can be selected such that these gears are sufficiently stable for the drive torque to be transmitted.

The mounting orifice can be formed in a side wall of the portal housing on the axle bracket side and closed by means of a cover.

However, it is also possible that the portal housing comprises a housing part on the hub carrier side and a housing part on the axle bracket side which can be connected to one another, and the separation between the two housing parts extends transverse to the output shaft, and the mounting orifice facing the axle bracket side in the housing part on the hub carrier side forms the mounting orifice that can be closed by the housing part on the axle bracket side.

In this regard, the cover can be connected to the portal housing, or the two housing parts of the portal housing can be connected to one another, by a screw connection so that assembly can be facilitated.

To facilitate arrangement of the bearing pins for the intermediate wheels in the portal housing, bearing pin openings which are parallel to the drive shaft and in which bearing pins extending parallel to the drive shaft into the interior of the portal housing can be fixedly inserted can be formed in a side wall of the portal housing on the hub carrier side, the intermediate wheels being rotatably mounted on the bearing pins.

A reliable bearing support of the drive shaft is achieved in that the cover or the housing part on the axle bracket side is formed with an half-shaft bearing bush, wherein the half-shaft is rotatably mounted in the half-shaft bearing bush or in a rolling element bearing inserted into the half-shaft bearing bush.

The portal housing can have a connection piece which projects out with respect to the hub carrier side and which is coaxial to the output shaft and to which the hub carrier can be connected.

BRIEF DESCRIPTION OF THE DRAWINGS

Embodiment examples of the invention are shown in the drawing and are described more fully in the following. The drawings show:

FIG. 1 a perspective, exploded view of a first embodiment example of a portal axle of the present invention; and FIG. 2 a perspective, exploded view of a second embodiment example of a portal axle of the present invention.

DETAILED DESCRIPTION OF THE PRESENTLY PREFERRED EMBODIMENTS

The portal axles shown in the drawings have a portal housing 1, 1' in the interior 2 of which are arranged a drive wheel 3, two identical intermediate wheels 4 and an output wheel 5.

The drive wheel 3 rotatably drives the two intermediate wheels 4, and the two intermediate wheels 4 in turn rotatably drive the output wheel 5. In this regard, the drive wheel 3 sits on a drive shaft 17 which extends into the interior 2 of the portal housing 1, 1' proceeding from an axle bracket, not shown, and carries the drive wheel 3 so as to be fixed with respect to rotation relative to it.

The output wheel 5 sits on an output shaft, not shown, so as to be fixed with respect to rotation relative to it, which output shaft is paraxial to the drive shaft 17, is guided out of the portal housing opposite to the drive shaft 17 and extends into a hub carrier 6.

The drive wheel 3 has twenty-two teeth, the intermediate wheels 4 each have sixty-nine teeth and the output wheel 5 has fifty-five teeth. Accordingly, the output wheel 5 has a smaller diameter than the intermediate wheels 4.

The portal housing 1, 1' has a connection piece 7 which projects out relative to the hub carrier side and is coaxial to the output shaft. A flattened portion 8 is formed at the outer contour of the connection piece 7, and the brake caliper of a disk brake can be arranged close to this flattened portion 8 (e.g., three millimeters).

In the embodiment example in FIG. 1, the portal housing 1 has a mounting orifice 9 which is directed toward the axle bracket side and which has a larger diameter than the diameter of the intermediate wheels 4. The portal housing 1 on the hub carrier-side side has bearing pin openings 11 which extend parallel to the rotational axis of the output wheel 5 and into which bearing pins 12 extending into interior 2 are inserted (see FIG. 2). Rolling element bearings 13 can be fitted on the bearing pins 12 through the mounting orifice 9 and intermediate wheels 4 can be fitted on the rolling element bearings 13 through the mounting orifice 9.

Proceeding from the interior 2, a bearing flange 15 can be arranged at the side wall 14 on the axle bracket side, which side wall 14 surrounds the mounting orifice 9 annularly. A second rolling element bearing 16, by means of which the output wheel 5 inserted through the mounting orifice 9 into the interior 2 is rotatably mounted, sits on the bearing flange 15.

The mounting orifice 9 can be closed by a cover 18 which is formed with a bearing bush 19 in the center in which the drive shaft 17 carrying the drive wheel 3 is rotatably supported via a rolling element bearing, not shown. The drive wheel 3 is likewise inserted through the mounting orifice 9 into the interior 2.

The output wheel 5 sits on the output shaft, not shown, which is guided through the connection piece 7 into the hub carrier 6.

In the embodiment example in FIG. 2, the portal housing 1' comprises a housing part 20 on the hub carrier side and a housing part 21 on the axle bracket side which can be connected to one another by a screw connection. The separation between the two housing parts 20 and 21 extends transverse to a drive shaft 17 which is guided into the interior 2 of the portal housing 1' proceeding from the axle bracket side through an opening 22 in the housing part 21 on the axle bracket side and carries the drive wheel 3 such that it is fixed with respect to rotation relative to it. The opening which is arranged centrically in the housing part 21 on the axle bracket side is constructed with a bearing bush 19 in which the drive shaft 17 carrying the drive wheel 3 is rotatably mounted via a rolling element bearing, not shown.

As in the embodiment example in FIG. 1, bearing pin openings 11 are formed in the hub carrier-side side wall 10 of the hub carrier-side housing part 20, which bearing pin openings 11 extend parallel to the rotational axis of the drive shaft 17, and bearing pins 12 projecting into the interior 2 are fixedly inserted in the bearing pin openings 11.

Alternatively, the bearing pins 12 can be cast integral with housing part 20 and accordingly inseparably connected to housing part 20.

The opening facing the axle bracket side in the hub carrier-side housing part 20 forms a mounting orifice 9' through which rolling element bearings 13 can be fitted on the bearing pins 12 and through which the intermediate wheels 4 can be fitted on the rolling element bearings 13.

The output wheel 5 which can likewise be guided through the mounting orifice 9' into the portal housing 1' is rotatably mounted on two sides on two rolling element bearings 16 which are arranged at the housing part 20 on the hub carrier side and at the housing part 21 on the axle bracket side.

The output wheel 5 sits on the output shaft, not shown, which is guided through the connection piece 7 into the hub carrier 6.

Thus, while there have shown and described and pointed out fundamental novel features of the invention as applied to a preferred embodiment thereof, it will be understood that various omissions and substitutions and changes in the form and details of the devices illustrated, and in their operation, may be made by those skilled in the art without departing from the spirit of the invention. For example, it is expressly intended that all combinations of those elements and/or method steps which perform substantially the same function in substantially the same way to achieve the same results are within the scope of the invention. Moreover, it should be recognized that structures and/or elements and/or method steps shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto.

The invention claimed is:

1. A portal axle for low-floor vehicles, comprising:
   a portal housing having an interior;
   a drive shaft guided into said interior from an axle bracket side;
   a drive wheel arranged so as to be fixed with respect to rotation relative to said drive shaft;
   intermediate wheels rotatably mounted on bearing pins in said portal housing, said intermediate wheels rotatably driveable by said drive wheel;
   an output wheel arranged to be rotatably driven by said intermediate wheels and arranged in said portal housing on an output shaft so as to be fixed with respect to rotation relative to the output shaft, said output wheel projecting into a hub carrier which can be fixedly connected to said portal housing;
   wherein said drive shaft and the output shaft extend so as to be axially offset, and wherein a brake caliper of a disk brake is arranged radially adjacent to said portal housing;
   wherein said portal housing comprises on the axle bracket side a mounting orifice which can be closed by a closure part and which is dimensioned so that said drive wheel and said intermediate wheels can be inserted into said portal housing through said orifice;
   wherein said intermediate wheels and said output wheel have respective diameters and wherein the respective diameter of said intermediate wheel is larger than the respective diameter of said output wheel; and
   further comprising the bearing pins and bearing pin openings and wherein said bearing pin openings formed in a side wall of the portal housing on the hub carrier side are parallel to said drive shaft and said bearing pins extending parallel to said drive shaft into said interior of said portal housing can be fixedly inserted into said bearing pin openings and wherein said intermediate wheels are rotatably mounted on said bearing pins.

2. The portal axle according to claim 1, wherein said mounting orifice is dimensioned so that said drive wheel, said output wheel and said intermediate wheels can be inserted into said portal housing.

3. The portal axle according to claim 2, wherein said drive wheel has twenty-two teeth, said intermediate wheel or intermediate wheels has or have sixty-nine teeth and said output wheel has fifty-five teeth.

4. The portal axle according to claim 2, wherein said mounting orifice is formed in a side wall of said portal housing on the axle bracket side and wherein said closure part is a cover.

5. The portal axle according to claim 1, wherein said drive wheel has twenty-two teeth, said intermediate wheel or intermediate wheels has or have sixty-nine teeth and said output wheel has fifty-five teeth.

6. The portal axle according to claim 5, wherein said mounting orifice is formed in a side wall of said portal housing on the axle bracket side and wherein said closure part is a cover.

7. The portal axle according to claim 1, wherein said mounting orifice is formed in a side wall of said portal housing on the axle bracket side and wherein said closure part is a cover.

8. The portal axle according to claim 7, wherein said cover can be connected to said portal housing, or said two housing parts of said portal housing can be connected to one another by a screw connection.

9. The portal axle according to claim 7, additionally comprising a drive shaft bearing bush and wherein said cover or said housing part on the axle bracket side is formed with said drive shaft bearing bush, and wherein said drive shaft is rotatably mounted in said drive shaft bearing bush.

10. The portal axle according to claim 9, additionally comprising a rolling element bearing and wherein said rolling element bearing is inserted into the drive shaft bearing bush.

11. The portal axle according to claim 1, wherein said portal housing comprises a housing part on a hub carrier side and a housing part on the axle bracket side which can be connected to one another, and the separation between the two housing parts extends transverse to said drive shaft, and wherein said mounting orifice facing the axle bracket side in said housing part on the hub carrier side forms the mounting orifice that can be closed by the housing part on the axle bracket side.

12. The portal axle according to claim 11, additionally comprising a drive shaft bearing bush and wherein said cover or said housing part on the axle bracket side is formed with said drive shaft bearing bush, and wherein said drive shaft is rotatably mounted in said drive shaft bearing bush.

13. The portal axle according to claim 1, wherein said bearing pins 12 are inseparably connected to said housing part by casting.

14. The portal axle according to claim 1, wherein said portal housing has a connection piece which projects out with respect to the hub carrier side and which is coaxial to the output shaft and to which the hub carrier can be connected.

* * * * *